United States Patent [19]

Lingscheit

[11] 4,056,589
[45] Nov. 1, 1977

[54] METHOD FOR SINTERING CERAMICS

[75] Inventor: James N. Lingscheit, Dearborn, Mich.

[73] Assignee: Ford Motor Company, Dearborn, Mich.

[21] Appl. No.: 658,982

[22] Filed: Feb. 18, 1976

[51] Int. Cl.$^2$ ............................................. C04B 35/10
[52] U.S. Cl. ..................................... 264/65; 264/104; 429/191; 429/193
[58] Field of Search ..................... 264/65, 30, 56, 104; 429/191, 193

[56] References Cited

U.S. PATENT DOCUMENTS

| | | | |
|---|---|---|---|
| 3,495,630 | 2/1970 | Hansen et al. | 264/30 |
| 3,819,785 | 6/1974 | Argyle et al. | 264/66 |
| 3,950,463 | 4/1976 | Jones | 264/66 |

*Primary Examiner*—Robert F. White
*Assistant Examiner*—John A. Parrish

*Attorney, Agent, or Firm*—Roger L. May; Keith L. Zerschling

[57] ABSTRACT

A method of sintering green ceramic bodies comprised of polycrystalline bi- or multi-metal oxides comprising: (A) encapsulating the body to be sintered in a chamber having (i) an inner wall portion comprised of a sintered polycrystalline bi- or multi-metal oxide composition of the same type as the body being sintered such that upon heating during the sintering process volatile metal oxide constituents of said composition create an atmosphere of said constituents which surrounds the body being sintered and (ii) an outer wall portion comprised of a substantially impervious sintered ceramic which is essentially nonreactive with said polycrystalline bi- or multi-metal oxides; and (B) heating the chamber with said body encapsulated therein to a temperature and for a time necessary to sinter said body to the desired density.

12 Claims, 3 Drawing Figures

METHOD FOR SINTERING CERAMICS

This application relates to a method of sintering green ceramic bodies comprised of polycrystalline bi- or multi-metal oxides. More particularly, this application relates to a method of sintering green ceramic bodies of the above composition in a manner such that said bodies do not suffer a loss of volatile metal oxides during sintering. Still more particularly, this application relates to a method of sintering elongate green ceramic bodies such as tubes or rods, of the above composition. Finally, this invention relates to a method of sintering shaped, green ceramic bodies, such as tubes, which are useful as a solid crystalline electrolyte for energy conversion devices.

BACKGROUND OF THE INVENTION

The green ceramic bodies to which the sintering process of this invention is applicable are comprised of polycrystalline bi- or multi-metal oxides. Shaped bodies formed from such compositions are particularly useful as solid electrolytes in energy conversion devices, particularly those employing molten metals and/or molten metal salts as reactants.

Among the numerous polycrystalline bi- or multi-metal oxide to which the process of this invention is applicable are the beta-type alumina compositions, all of which exhibit a generic crystalline structure which is readily identifiable by X-ray diffraction. Thus, Beta-type alumina or sodium Beta-type-alumina is a material which may be thought of as a series of layers of aluminum oxide held apart by columns of linear Al—O bond chains with sodium ions occupying sites between the aforementioned layers and columns. Among the numerous polycrystalline Beta-type-alumina materials which may be processed in accordance with the process of this invention are the following:

1. Standard Beta-type-alumina which exhibits the above-discussed crystalline structure comprising a series of layers of aluminum oxide held apart by layers of linear Al—O bond chains with sodium occupying sites between the aforementioned layers and columns. Beta-type-alumina is formed from compositions comprising at least about 80% by weight, preferably at least about 85% by weight of aluminum oxide and between about 5 and about 15 weight percent, preferably between about 8 and about 11 weight percent, of sodium oxide. There are two well-known crystalline forms of Beta-type-alumina, both of which demonstrate the generic Beta-type-alumina crystalline structure discussed hereinbefore and both of which can easily be idntified by their own characteristic X-ray diffraction pattern. Beta-alumina is one crystalline form which may be represented by the formula $Na_2O.11Al_2O_3$. The second crystalline is $\beta''$-alumina which may be represented by the formula $Na_2O.6Al_2O_3$. It will be noted that the $\beta''$ crystalline form of Beta-type-alumina contains approximately twice as much soda (sodium oxide) per unit weight of material as does the Beta-alumina.

2. Boron oxide $B_2O_3$ modified Beta-type-alumina wherein about 0.1 to about 1 weight percent of boron oxide is added to the composition.

3. Substituted Beta-type-alumina wherein the sodium ions of the composition are replaced in part or in whole with other positive ions which are preferably metal ions.

4. Beta-type-alumina which is modified by the addition of a minor proportion by weight of metal ions having a valence not greater than 2 such that the modified Beta-type-alumina composition comprises a major proportion by weight of ions of aluminum and oxygen and a minor proportion by weight of a metal ion in crystal lattice combination with cations which migrate in relation to the crystal lattice as result of an electric field, the preferred embodiment for use in such electrical conversion devices being wherein the metal ion having a valence not greater than 2 is either lithium or mangesium or a combination of lithium and magnesium. These metals may be included in the composition in the form of lithium oxide or magnesium oxide or mixtures thereof in amounts ranging from 0.1 to about 5 weight percent.

The above polycrystalline materials and some of the electrical conversion devices in which they may be employed as a solid electrolyte are disclosed in the following U.S. Pat. Nos.: 3,404,032; 3,404,036; 3,413,150; 3,446,677; 3,458,356; 3,468,709; 3,468,719; 3,475,220; 3,475,223; 3,475,225; 3,535,163; 3,719,531; and 3,811,943.

The bi- and multi-metal oxides having the beta-alumina type crystalline lattice make particularly effective separators and/or solid electrolytes for use in energy conversion devices. In the operation of such energy conversion devices, the cations such as sodium in the polycrystalline bi- or multi-metal oxide, or some other cation which has been substituted for sodium in part of whole, migrate in relation to the crystal lattice as a result of effects caused by an electric field. Thus, the solid ceramic electrolytes for which the sintering method of this invention is particularly suited provide selective cationic communication between the anodic and cathodic reaction zones of the energy conversion devices and are essentially impermeable to the fluid reactants employed in the device when the reactants are in the elemental, compound or anionic state. Among the energy conversion devices in which the particular sintered polycrystalline bi- or multi-metal oxides, e.g., tubes, envelopes, etc., are useful are: (1) primary batteries employing electrochemically reactive oxidants and reductants in contact with and on opposite sides of the solid electrolyte; (2) secondary batteries employing molten, electrochemically reversibly reactive oxidants and reductants in contact with and on opposite sides of the solid electrolyte; (3) thermoelectric generators wherein a temperature and pressure differential is maintained between anodic and cathodic reaction zones and/or between anode and cathode and a molten alkali metal is converted to ionic form, passed through the polycrystalline wall or inorganic membrane and reconverted to elemental form; and (4) thermally regenerated fuel cells.

The shaped ceramic bodies which are used as solid electrolytes in such energy conversion devices must be of uniform composition and high quality, e.g., good electrical characteristics. For many applications, particularly where tubes or rods are employed, it is also critical that the bodies be free of warpage and bending. The prior art teaches many methods of sintering polycrystalline materials, but in many cases the shaped sintered bodies are warped or bent to a greater or lesser degree. One explanation for such bending or warping of the shaped member is that temperature gradients exist along the length and width thereof, thus resulting in variations in sintering rate and mechanism which, in turn, results in bending and warping.

In many other cases, the composition of the body being sintered varies or deviates from that desired largely as a result of the loss of volatile components, such that properties, including electrical characteristics are impaired. Because of this problem of loss of volatile constituents such as sodium oxide or soda from compositions such as beta-type-alumina, it had been necessary in the past, when sintering shaped ceramic bodies for use in electrical conversion devices, to sinter the green body while it is embedded or packed in beta-alumina powder. For example, it had been common practice to sinter the shaped, green ceramic bodies in a crucible such as a platinum-rhodium crucible in which it is packed in coarse powder of beta-alumina, i.e., particles of one micron diameter. While this method is effective in maintaining the soda content of the beta-alumina ceramic, it is particularly troublesome in that it is difficult to remove the sintered shaped ceramic body from the surrounding sintered beta-alumina packing. This, of course, is time consuming and does not render the method acceptable for any type of commercial preparation of the ceramic member. Still another possible disadvantage of the process will be discussed hereinafter.

An alternative to sintering a body while it is packed in a powder of the same or similar composition comprises encapsulating or enclosing the green body to be sintered in a container formed from a noble metal which maintains its shape at the sintering temperature of the body. Noble metals which may be employed as the sintering tube or envelope in the process includes platinum, rhodium, alloys of two or more noble metals and alloys of noble metals with non-noble metals. This noble metal encapsulation process results in shaped bodies which are bend and warp free. To a certain extent it also overcomes the problem of loss of volatile metal oxide, e.g., sodium oxide, from the ware as it is sintered. However, some volatile loss still occurs with the process.

BRIEF DESCRIPTION OF THE INVENTION

The process of this invention is an improvement over both the packed powder process and the noble metal encapsulation process. Briefly, the process comprises encapsulating or enclosing the ware to be sintered and heating to sintering temperature in a chamber which has an interim surface of inner wall portion formed of a sintered ceramic composition which is of the same type, although not necessarily the same composition, as the ware being sintered. This portion of the chamber is covered with or clad with an outer wall portion which is formed of a sintered ceramic material which is substantially impervious and which is essentially nonreactive with the ceramic being sintered.

The process, which results in a relatively warp-and bend-free body exhibiting essentially no volatile loss, will be more fully understood from the detailed description of the invention which follows when taken in combination with the drawings in which.

DETAILED DESCRIPTION OF THE INVENTION

Figure 1:
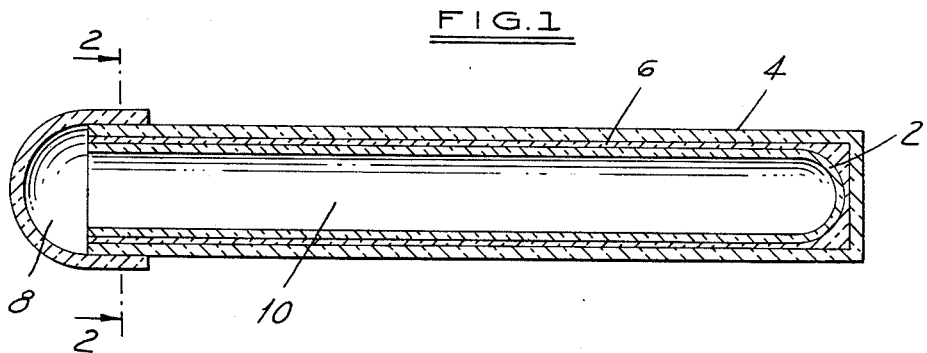
FIG. 1 shows one embodiment of the sintering chamber useful in the process of this invention.

The invention relates to a method for sintering green ceramic bodies comprised of polycrystalline bi- or multi-metal oxides such as are discussed above. The method comprises: (A) encapsulating the body to be sintered in a chamber having inner and outer wall portions, with the inner wall portion being (i) adjacent to said body being sintered and (ii) comprised of a sintered polycrystalline bi- or multi-metal oxide composition of the same type as said body being sintered such that upon heating during the sintering process volatile metal oxide constituents of the composition create an atmosphere which surrounds the body being sintered, and with the outer wall portion being (i) adjacent to, contiguous with and integrally bonded to the entire outer surface of said inner wall portion, and (ii) comprised of a substantially impervious sintered ceramic which is essentially nonreactive with said polycrystalline bi- or multi-metal oxides; and (B) heating the chamber with the body encapsulated therein to a temperature and for a time necessary to sinter the body to the desired density.

In the particularly preferred embodiments of the process both the body being sintered and the inner wall portion of the chamber are comprised of a composition selected from beta-type alumina and modified beta-type alumina, with $\beta''$-alumina and modified $\beta''$-alumina being most preferred. In these preferred embodiments, the outer wall portion which is integrally bonded to the inner wall portion is preferably alpha-alumina. Alpha-alumina when sintered to a high density is substantially impervious annd is essentially nonreactive with beta-type-alumina after some initial reaction. This latter fact is contrary to what had been believed to be the case by those skilled in $\beta''$-alumina processing. Their belief was based on the propensity of alpha-alumina to react and suffer a destructive transformation when exposed to sodium oxide vapors. However, it has been found that sodium transport phenomenon experienced across the interface of a sintered $\alpha$-$\beta''$ alumina composite is very much different than the previously reported observations of $\alpha$-$Al_2O_3$ immersed in $NaAlO_2$ or $Na_2O$ vapor. In fact, it has been observed that reaction across the $\alpha$-$\beta''$ interface rapidly slows to the point where no progression can be discerned. Clearly, sodium oxide or soda loss from the inner wall portion of beta-type alumina can be prevented if the $\alpha$-alumina cladding remains unreactive and structurally sound.

It will be appreciated that by employing as the inner wall of the sintering chamber a sintered polycrystalline material which is of the same composition as the material being sintered, an over pressure of the volatile metal oxide, e.g., sodium oxide, from the polycrystalline material will be created within the chamber and will surround the ware. This overpressure effectively eliminates the loss of such volatile material from the body being sintered.

In the noble metal encapsulation process discussed above, the volatile metal oxides, such as sodium oxide, atmosphere is created within the chamber by vaporization of the oxide from the ware. Although the chamber in that process is closed such that the oxide cannot escape, there is some loss of the metal oxide from the final sintered body.

There are certain similarities between the process of this invention and the packing powder process discussed above. Of course, the process of this invention overcomes the difficulties of the packing powder process which are discussed above in a manner which is apparent. However, the process appears to have still another advantage over the packing powder process in that because of the much lower surface area of the encapsulating tube as compared to that of the packing powder, the composition of the encapsulated body will not be affected during sintering. The high concentration of packing powder around the ware may have an effect on the composition of the body in that process.

Figure 2:
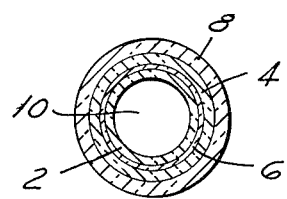
FIG. 2 is a cross-section of the tubular chamber of FIG. 1 taken along line 2—2 of FIG. 1.

One embodiment of a chamber useful in the process of the invention, illustrated in FIG. 1 in a longitudinal sectional view and in cross-section in FIG. 2, may be prepared by cladding a sintered polycrystalline bi- or multi-metal oxide tube 2, e.g., a $\beta''$-alumina tube, with an outer wall portion comprising a sintered tube of a substantially impervious ceramic which is essentially nonreactive with tube 2, e.g., alpha-alumina. In the embodiment illustrated there is shown a layer 6 of a ceramic cement of the same composition as outer wall portion 4. Thus, the chamber may be prepared by applying a ceramic cement 6 between tubes 2 and 4 and then heating to sinter the cement layer 6 and integrally bond the two tubes. It will be appreciated that other means of preparing such a chamber with inner and outer wall portions may be employed. For example, an unsintered ceramic composition suitable for the outer wall portion could merely be applied to tube 2 and sintered thereon.

As will be noted from FIGS. 1 and 2 the chamber shown therein is tubular and is fitted with a ceramic cap 8 which may be formed of the same ceramic material as the outer wall portion of the sintering chamber. In practicing the process of the invention, the shaped body to be sintered, e.g., a tube or rod, is placed in the tubular chamber interior space 10 and the cap 8 applied to the tubular chamber so as to completely encapsulate the green body. The tubular chamber shown in FIG. 1 is then placed in a furnace and heated to a temperature and for a time necessary to achieve the density desired in the sintered product. After sintering, cap 8 is removed and the sintered body removed. The sintering chamber may then be reloaded and reused.

Figure 3:
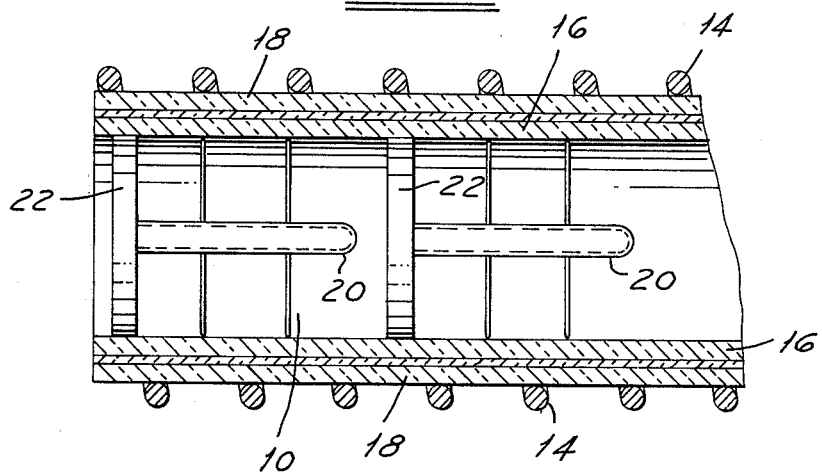
FIG. 3 is a schematic view of a second type of encapsulation chamber used in the process of the invention.

A second embodiment of a chamber useful in practicing the process of this invention is shown in FIG. 3. The Figure is a schematic longitudinal sectional diagram of a tubular furnace muffle generally indicated at 12 which is surrounded by coil 14. In this embodiment, the walls of the furnace muffle serve as walls of the reaction or sintering chamber. The inner wall portion 16, which is adjacent to the polycrystalline body being sintered, is formed of the same type of polycrystalline material as the body being sintered. Outer wall portion 18 covers inner wall portion 16 is integrally bonded thereto, is substantially impervious and is essentially nonreactive with inner wall portion 16.

The device shown in FIG. 3 is adapted such that shaped bodies 20, such as tubes or rods, may be passed continuously therethrough. In order to completely encapsulate body 20 in space 10 interiorly of the walls of said furnace muffle 12 ceramic bodies 22, which are adapted to move through muffle 12 while enclosing space 10, may be employed. These ceramic bodies 22, like cap 8 above also are substantially impervious and non-reactive.

It will be appreciated that the illustrated embodiments are merely exemplary of some of the chambers which fall within the scope of the invention as herein defined. Modifications will be apparent to those skilled in the art. For example, the configuration of the entire chamber or interior space 10 may be designed to accommodate various shaped bodies 22.

The invention described above will be still more fully understood from the following examples which are merely intended to be illustrative and not limiting.

EXAMPLE I

Preparation of Sintering Chamber

The preparation of this composite, encapsulation assembly entails the forming and sintering of an inner, $\beta''$-alumina member followed by subsequent cladding of the member and a second sintering step necessary to densify the cladding material.

The $\beta''$-alumina inner wall portion is prepared generally in accordance with the procedure set forth in detail below for preparing the ware or body to be sintered in accordance with the process. The inner wall portion $\beta''$-alumina tube employed has a final composition of 9.25% sodium oxide, 0.25% lithium oxide, and 90.5% aluminum oxide. This inner wall portion tube of $\beta''$-alumina which is 15–18 mm. in diameter is cast into a large dense alpha-alumina tube using an alpha-alumina cement mixed to a workable consistency with water. The composite assembly was dried at 120° C. overnight. A tight-fitting alpha alumina endcap (actually a section cut from a larger, closed end tube) was used to seal the open-ended composite assembly, and the cement was then sintered to density in an air atmosphere by firing the entire mass at 1550° C. for 30 minutes. The densified, composite tube was then ready to be used as an encapsulation chamber for the sintering of $\beta''$-alumina greenware.

Preparation of the Shaped Greenware

Sodium carbonate and lithium nitrate of reagent grade are dried at 280° C. and 120° C. respectively, and cooled and stored in desiccators. Linde "C" alumina, the other component of the ceramic composition is used as received and stored in plastic bags. In order to produce 100 parts by weight of the final reactive ceramic product, 14.88 g. of sodium carbonate ($Na_2CO_3$), 3.22 g. of lithium nitrate ($LiNO_3$) and 90.60 g. of aluminum oxide ($Al_2O_3$) are weighed in air and dry mixed on a paint shaker in polyethylene bottles containing Lucalox balls. The reacted ceramic composition which will be obtained from these reactants will comprise 8.70 weight percent of sodium oxide ($Na_2O$), 0.70 weight percent of lithium oxide ($Li_2O$) and 90.60 weight percent of aluminum oxide.

The mixture of reactants is next rolled out on aluminum foil and the balls removed. The composition is then placed in a covered platinum container, reacted at 1260° C. for 2 hours, and cooled in air. The reacted powder is again rolled to remove lumps, reloaded into the mixing container along with Lucalox balls and run again on the paint shaker. After this last mixing operation, the composition is again rolled to remove all of the Lucalox balls.

The 100 grams of the final reacted product is dissolved in 612 mls. of acetone and 50 grams of a polyvinylbutyral in acetone is added while stirring. The polyvinylbutyral solution is prepared by dissolving 10 grams of polyvinylbutyral in 100 mls. of acetone and mixing thoroughly. The addition of the polyvinylbutyral-acetone solution to the reacted powder solution results in the formation of a yellow rind which is scrapped as well as a white wax powder which is used. The waxed powder is then rolled again and stored in plastic bottles.

The powder is poured into a mold containing a steel mandrel. The mold is designed to make closed-end tubes, the lower end of the mandrel being such that it will float. Care should be taken to make sure that the mandrel is in the center of the mold. After pouring the powder into the mold, the tubes are pressed at 60,000 psi pressure and X-rayed to insure uniform wall thickness before the nonuniform top section of the tube is discarded.

The tube is next prefired overnight to burn off the organic binder (polyvinylbutyral). The tubes are then cooled, the green density measured, and then stored in desiccators pending the final sintering operation.

A number of samples of such $\beta''$-alumina tubes were each sintered using a single encapsulation chamber as prepared above with the open end of the greenware facing toward the nose of the chamber. All samples were fired with a 20-minute hold at 1585° C. The encapsulating chamber was disposed in the furnace horizontally. As will be noted in the following chart showing sintered densities and the leak rate for helium, the tubes fired later tended to reduce in density. However, the density determinations were carried out on sections of the tube removed prior to complete firing. Also, these sections were nearer to the open end of the green, as pressed tube; so that the fired density variation may indicate: (1) a loss in soda and incomplete sintering, (2) a fired density reflective of green density variations along the tube length, or (3) temperature variations along the tube length. Since thee seems to be no clear correlation between the degree of densification and the hermeticity of a number of tubes, soda loss does not seem to be a problem.

| Firing Number | % Density | Leak Rate (Helium) |
|---|---|---|
| 1 | 98.7 | $1 \times 10^{-10}$ atm - cc/sec |
| 2 | 98.5, 98.5 | $1.2 \times 10^{-10}$ |
| 3 | 98.1, 98.0 | $1.6 \times 10^{-10}$ |
| 4 | 98.6, 98.4 | $1.2 \times 10^{-10}$ |
| 5 | 96.9, 96.1 | $1.1 \times 10^{-10}$ |
| 6 | 96.6, 97.4 | $1.5 \times 10^{-10}$ |
| 7 | 94.4, 95.3, 95.6 | $1.6 \times 10^{-10}$ |
| 8 | 96.2, 97.2, 97.3 | |

EXAMPLE II

A second group of $\beta''$-alumina green tubes were fired in an encapsulation chamber such as used in Example I in the same manner as in Example I except that the hold time at the sintering temperature varied. The data for these tubes is set forth below:

| Firing Number | Time | Density |
|---|---|---|
| 1 | 30 min. | 95.7, 96.8 |
| 2 | 22 min. | 95.4, 96.6 |
| 3 | 30 min. | 95.9, 97.6 |

EXAMPLE III

Four $\beta''$-alumina tubes of the same composition as in Example I were fired in an encapsulation chamber as in Example I except that the chamber was rotated 90° in the furnace to vertical position and the hold times at sintering temperature were varied. The date for these tubes is set forth below:

| Firing Number | Time | Density |
|---|---|---|
| 1 | 30 min. | 96.6, 97.4 |
| 2 | 30 min. | 96.8, 97.8 |
| 3 | 30 min. | 95.8, 98.8, 96.7, 97.0, 96.8, 96.3, 95.3 |
| 4 | 32 min. | 94.5, 96.3, 97.4, 96.9, 97.2, 96.8, 95.3 |

EXAMPLE IV

Three $\beta''$-alumina tubes of the same composition as in Example I are sintered as in Example III except that the nose end of the greenware is in the nose end of the encapsulation chamber. The date for these tubes is set forth below:

| Firing Number | Time | Density |
|---|---|---|
| 1 | 35 mins. | 95.8, 98.9, 96.7, 97.0, 96.8, 96.3, 95.3 |
| 2 | 30 mins. | 95.3, 96.0, 96.5, 96.5, 96.6, 96.7, 96.0 |
| 3 | 30 mins. | 95.5, 97.2, 97.4, 97.5, 97.4, 97.2, 96.2 |

EXAMPLE V

Tubes such as prepared in Example I are sintered by passing through a furnace muffle, the inner wall portion of which is formed of beta-type-alumina which is the same as that used for the inner wall portion in Example I. The muffle employed is tubular and the encapsulation of the $\beta''$-alumina tubes is completed by alpha alumina discs which are adapted to move through said muffle in tandem.

Based upon the foregoing description of the invention what is claimed and desired to be protected by Letters Patent is:

1. A method for sintering a green ceramic body comprised of polycrystalline bi- or multi-metal oxides comprising:
   A. encapsulating said body in a chamber having inner and outer wall portions, said inner wall portion being
      i. adjacent to said body being sintered and
      ii. comprised of a sintered polycrystalline bi- or multi-metal oxide composition of the same type as said body being sintered such that upon heating during the sintering process volatile metal oxide constituents of said composition create an atmosphere of said constituents which surrounds said body being sintered, and
   said outer wall portion being
      i. adjacent to, contiguous with and integrally bonded to the entire outer surface of said inner wall portion and
      ii. comprised of a substantially impervious sintered ceramic which is essentially nonreactive with said polycrystalline bi- or multi-metal oxides; and
   B. heating said chamber with said body encapsulated therein to a temperature and for a time necessary to sinter said body to the desired density.

2. A process in accordance with claim 1 wherein said body being sintered and said inner wall portion of said chamber are comprised of a composition selected from beta-type alumina and modified beta-type alumina.

3. A process in accordance with claim 2 wherein said outer wall portion of said chamber is comprised of alpha alumina.

4. A process in accordance with claim 2 wherein said body being sintered and said inner wall portion of said chamber are comprised of a composition selected from $\beta''$-alumina and modified $\beta''$-alumina.

5. A process in accordance with claim 4 wherein said outer wall portion of said chamber is comprised of alpha alumina.

6. A process in accordance with claim 1 wherein said chamber has been formed by cladding a sintered polycrystalline bi- or multi-metal oxide inner wall portion with said outer wall portion by bonding said sintered inner wall portion to a sintered impervious ceramic body section of said outer wall portion with a ceramic cement comprised of the same chemical composition as said ceramic body section and heating the composite to sinter said cement such that said outer wall portion, which consists of said ceramic body section and said sintered cement, is integrally bonded to said inner wall portion.

7. A process in accordance with claim 6 wherein said ceramic body section of said outer wall portion and said sintered ceramic cement of said outer wall portion are comprised of alpha-alumina.

8. A process in accordance with claim 1 wherein said chamber is a tube, the open end of which is sealed with an essentially impervious sintered ceramic of the same composition as said outer wall portion.

9. A process in accordance with claim 1 wherein said chamber comprises a furnace muffle through which said ceramic body being sintered may be moved continuously.

10. A process in accordance with claim 9 wherein said chamber comprises the longitudinally extending walls of said furnace muffle and encapsulation of said body is completed by substantially impervious sintered ceramic bodies of the same composition as said outer wall portion, which bodies are adapted to move through said furnace muffle with said green ceramic body confined therebetween.

11. A process in accordance with claim 1 wherein said green ceramic body is tubular.

12. A process in accordance with claim 1 wherein said green ceramic body is rod-like.

* * * * *